Feb. 6, 1962 L. M. BARTON ET AL 3,020,482

SYNCHRONIZATION NETWORK

Filed July 13, 1959

INVENTORS:
LEON McNEIL BARTON,
EUGENE C. NORDELL,

BY T. E. Kristofferson

THEIR ATTORNEY.

United States Patent Office 3,020,482
Patented Feb. 6, 1962

3,020,482

SYNCHRONIZATION NETWORK

Leon M. Barton, Syracuse, and Eugene C. Nordell, North Syracuse, N.Y., assignors to General Electric Company, a corporation of New York Filed July 13, 1959, Ser. No. 826,547
7 Claims. (Cl. 328—55)

This invention relates to an improved synchronization network and, more particularly, to such a network employing a single delay line having different delays at different frequencies.

Prior art synchronization networks have required a short delay line, in addition to the customary delay line in the cancellation network, in order to provide an additional delay for the signal information of the same amount as the additional delay in the synchronization loop due to the trigger generators and amplifiers found therein. This was found necessary in order to provide exact synchronization of the network. Accordingly, it is an object of this invention to eliminate the necessity for such additional delay line.

Another object of this invention is to provide a synchronization network employing a delay line having a delay which varies with frequency such that the delay time of a signal information carrier therein is different from the delay time of the synchronization signal carrier.

A further object of this invention is to utilize such a delay line in a pulse repetition synchronization network and to provide carrier frequencies in the synchronization loop and the signal information path so related as to equalize the aggregate delays.

In carrying out the invention in one form thereof a synchronization loop is provided incorporating an amplifier, a trigger generator, a modulator and a delay line connected in series between the output and the input of a subtraction circuit. An attenuating network is connected between the input of the delay line and a second input of the subtraction circuit. The attenuating network has a transfer characteristic identical to the delay line and a negligible delay time. A signal path is provided by connecting a second modulator to the input of the delay line and attenuating network and taking an output from the subtraction circuit. The delay line has a delay time which varies with frequency and the two modulators employ different carrier frequencies such that the aggregate delay in the signal path is equal to the aggregate delay in the synchronization circuit path.

The novel features characteristic of the invention are set forth with particularity in the appended claims. The invention itself, however, together with further objects and advantages thereof can best be understood by reference to the following description taken in connection with the accompanying drawing in which:

Figure 1:
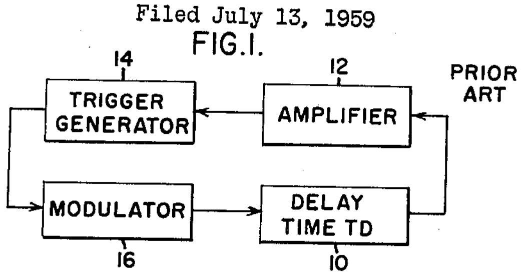
FIG. 1 represents one form of prior art network in block diagram form.

Referring now to the drawings, in FIG. 1 there is illustrated a pulse repetition frequency network employing a trigger generator which utilizes a delay line to circulate the synchronizing pulse in accordance with the prior art. This network employs a delay line 10, an amplifier 12, a trigger generator 14, and a modulator 16 connected in a loop as illustrated. The pulse repetition frequency, hereafter referred to as PRF, of the trigger generator 14 is less than $1/T_D$ by an amount $$\frac{T_x}{T_D(T_D+T_x)}$$

where $T_x$ is the delay time of all the circuitry external to the delay line 10. In the case where a PRF exactly equal to $1/T$ is desired then the delay time of the synchronizing pulse through the delay line 10 must be less than T by the time $T_x$.

Figure 2:
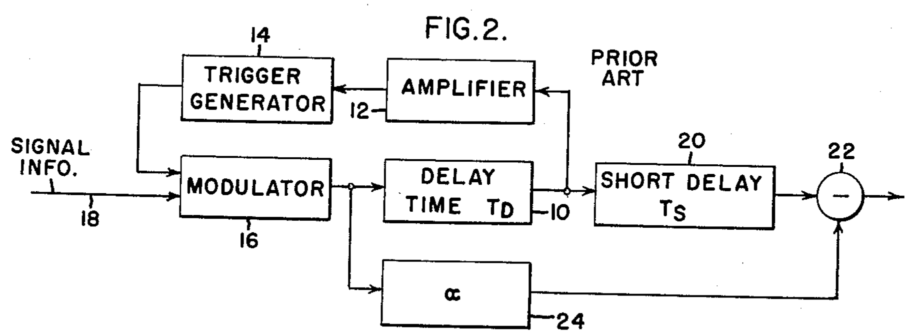
FIG. 2 represents a second prior art network in block form employing an additional short delay.

In the past this has been accomplished by the addition of a short delay in the manner illustrated in the circuit of FIG. 2, a second embodiment of the prior art. Identical numerals are used throughout the specification to designate components which serve the same functions in the various figures. In FIG. 2 there is illustrated the synchronization loop of FIG. 1 employing the delay line 10, amplifier 12, trigger generator 14 and modulator 16 connected in a loop. In addition a signal information input path 18 is provided to a second input of modulator 16. An additional delay line 20 is connected to the output of delay line 10 and to the input of the subtraction circuit 22. Attenuating network 24 having an identical transfer characteristic to the combination of delay line 10 and delay line 20, and a negligible delay time, is connected from the input of delay line 10 to a second input of subtraction circuit 22.

The circuit of FIG. 2 provides an additional short delay $T_S$ by means of delay line 20 which is equal to $T_x$, the delay of the additional circuitry in the synchronization loop. This additional short delay is in series with only the signal processing circuits in the signal path and serves to equalize the signal path delay and the synchronization loop delay.

Figure 3A:
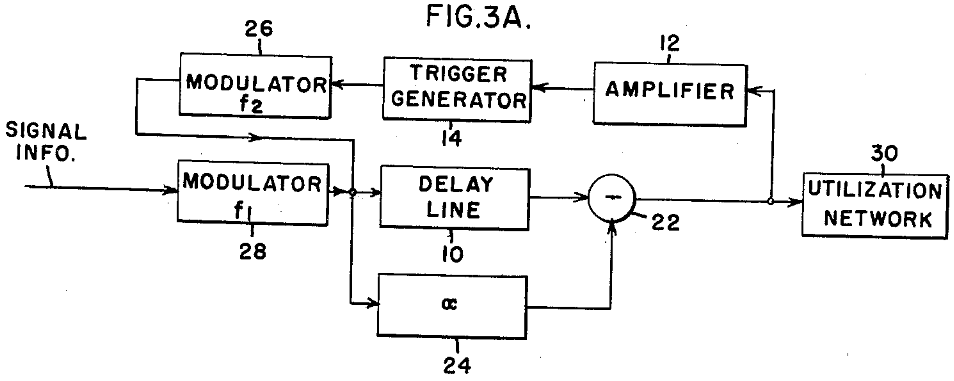
FIG. 3A represents one embodiment of the invention in block diagram form.

Turning now to FIG. 3A there is illustrated a method by which the short delay $T_S$, provided by delay line 20 of FIG. 2, is eliminated. In FIG. 3A the synchronization loop comprises an amplifier 12, trigger generator 14, modulator 26, and delay line 10 connected from the output of subtraction circuit 22 to its input. An attenuating network 24 is connected from the input of the delay line 10 to a second input of subtraction circuit 22, and has an identical transfer characteristic to the delay line 10 with a negligible delay time. A signal information path is provided by connecting a second modulator 28 to the input of delay line 10 and by taking an output from the subtraction circuit 22 and connecting it to a utilization circuit 30.

Figure 3B:
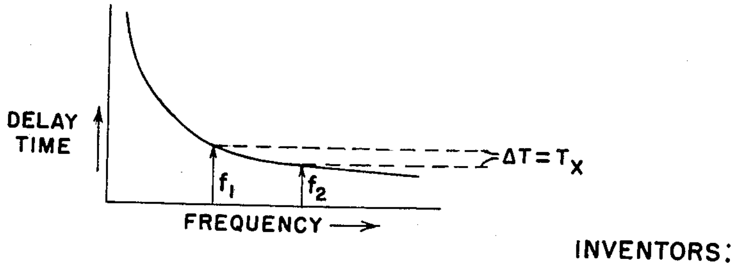
FIG. 3B represents a graph of the delay time vs. frequency characteristic of a delay line which may be incorporated in FIG. 3A.

The method by which the short delay $T_S$ of delay line 20, FIG. 2, is eliminated in the circuit illustrated in FIG. 3A makes use of a shorter delay time through a delay line for the synchronizing trigger than for the signal information. This required that the synchronizing trigger delay be less than the signal information delay through a common delay medium by the time $T_x$ set out in the discussion of the circuit of FIG. 1. In order to accomplish this the two modulators 26 and 28 provided in the circuit of FIG. 3A employ different carrier frequencies. The carrier frequency of the synchronizing trigger is higher than that of the signal channel. Thus, the desired delay equalization is accomplished by the use of frequency (multiplexing) in a delay line having a frequency-delay time characteristic which changes with frequency in the manner illustrated in FIG. 3B. A quartz delay line which has the characteristic illustrated in FIG. 3B is an example of the type of delay line which may be used for delay line 10 in the circuit of FIG. 3A. Thus, the aggregate delay through the delay line 10, subtraction circuit 22, amplifier 12, trigger generator 14 and modulator 26 at the carrier frequency $f_2$ of modulator 26 is equal to the aggregate delay of the signal path through delay line 10 and subtraction circuit 22 at the frequency $f_1$ of modulator 28. A moving target signal comparison is performed by a comparison network employing the circuitry of the delay line 10 in parallel with the attenuating network 24 by proportioning the delay of delay line 10 such that it is one or more cycles of the signal information and by subtracting in subtraction circuit 22.

Amplifier 12 may be proportioned such that it has a passband which will reject the carrier frequency $f_1$ of modulator 28 and pass the carrier frequency $f_2$ of modulator 26, thus isolating the signal information from the synchronization loop. The utilization circuit 30 also may incorporate a pass-band such that it rejects the synchronization signal carrier $f_2$ of modulator 26 and only employs the carrier frequency $f_1$ of modulator 28, thus utilizing only the signal information.

One specific embodiment of the invention may incorporate the following components in the circuit of FIG. 3A. Delay line 10 may be a 2778 microsecond, 20 megacycle quartz delay line as provided by Corning Glass Works under specification MR-34486. The amplifier 12 has a 30 megacycle per second center frequency, an 80 db gain and a 6 megacycle bandwidth. It has an output of detected video pulse from a low impedance source. Trigger generator 14 may be a blocking oscillator with free running PRF adjustable to approximately 300 cycles which will "lock in" at 360 cycles when the output of amplifier 12 is applied to the grid. Modulator 26 may be an amplitude type modulator employing a carrier frequency of 30 megacycles per second and having a bandwidth of at least 12 megacycles. Modulator 28 may be an amplitude, phase or frequency type modulator employing a 15 megacycle per second carrier frequency upon which signal information is impressed. Attenuation network 24 may be a resistive attenuator network with attenuation equal to that of delay line 10 at the carrier frequency of modulator 28. A band-pass shaping filter may be utilized in this circuit but would require a greater difference of delay times between the paths utilizing modulators 26 and 28.

While a particular embodiment of the invention has been illustrated, and particular characteristics have been disclosed, it will be understood, of course, that it is not intended to limit the invention thereto since many modifications may be made, and it is, therefore, contemplated by the appended claims to cover any such modifications as fall within the true spirit and scope of the invention.

What we claim and desire to secure by Letters Patent of the United States is:

1. A first signal path and a second signal path having unequal transmission time delays, means for applying first frequency signals to the input of said first signal path, a source of second frequency signals connected to the input of said second signal path, a common delay line having a delay time which varies with frequency, means for connecting the outputs of said first and second signal paths to the input of said common delay line, said source having an output frequency so related to the frequency of said first signals so that there is an identical delay time between the input of said first signal path and the output of said delay line at the frequency of said first signals and the input of said second signal path and the output of said delay line at the frequency of said second signals.

2. A pulse repetition frequency synchronization circuit comprising, a synchronization network having a trigger generator and a first modulator connected in series and having an aggregate first delay time, said modulator employing a first carrier frequency, a comparison network having a delay line and a network having an identical transfer characteristic as said delay line, and a negligible delay time, a subtraction circuit; the inputs of said delay line and said network being connected in parallel, means connecting the outputs of said delay line and said network to separate inputs of said subtraction circuit, a second modulator employing a second carrier frequency connected to the input of said comparison network, means for providing an input signal to said second modulator, means connecting said synchronization loop between the output of said subtraction circuit and the input of said comparison network, said delay line having a delay time which varies with frequency and said modulators having carrier frequencies such that the delay of the synchronization signal which includes the delay of the delay line plus said first delay is equal to the delay of said input signal in said delay line.

3. A pulse repetition frequency synchronization circuit comprising, a synchronization network having a trigger generator and a modulator connected in series and having an aggregate first delay time, said modulator employing a first carrier frequency, a comparison network having a delay line and a network having an identical transfer characteristic as said delay line and a negligible delay time, a subtraction circuit, the inputs of said delay line and said network being connected in parallel, means connecting the outputs of said delay line and said network to separate inputs of said subtraction circuit, means for providing an input signal at a second carrier frequency to said comparison network, means connecting said synchronization loop between the output of said subtraction circuit and the input of said comparison network, said delay line having a delay time which varies with frequency and said carrier frequencies being related such that the delay of the synchronization signal which includes the delay of the delay line plus said first delay is equal to the delay of said input signal in said delay line.

4. A pulse repetition frequency synchronization circuit comprising, a synchronization network having an amplifier, a trigger generator and a first modulator connected in series and having an aggregate first delay time, said modulator employing a first carrier frequency, a comparison network having a delay line and a network having an identical transfer characteristic as said delay line and a negligible delay time, a subtraction circuit, the inputs of said delay line and said network being connected in parallel, means connecting the outputs of said delay line and said network to separate inputs of said a subtraction circuit, a second modulator employing a second carrier frequency connected to the input of said comparison network, means for providing an input signal to said second modulator, means connecting said synchronization loop between the output of said subtraction circuit and the input of said comparison network, said delay line having a delay time which varies with frequency and said modulators having carrier frequencies such that the delay of the synchronization signal which includes the delay of the delay line plus said first delay is equal to the delay of said input signal in said delay line.

5. A pulse repetition frequency synchronization circuit comprising, a synchronization network having an amplifier, a trigger generator and a first modulator connected in series and having an aggregate first delay time, said modulator employing a first carrier frequency, a comparison network having a delay line and a network having an identical transfer characteristic as said delay line and a negligible delay time, a subtraction circuit, the inputs of said delay line and said network being connected in parallel, means connecting the outputs of said delay line and said network to separate inputs of said subtraction circuit, a second modulator employing a second carrier frequency connected to the input of said comparison network, means for providing an input signal to said second modulator, means connecting said synchronization loop between the output of said subtraction circuit and the input of said comparison network, said delay line having a delay time which varies with frequency, said modulators having carrier frequencies such that the delay of the synchronization signal which includes the delay of the delay line plus said first delay is equal to the delay of said input signal in said delay line, and said amplifier having a frequency pass-band capable of passing said first carrier frequency and rejecting said second carrier frequency.

6. A pulse repetition frequency synchronization circuit comprising, a synchronization network having an amplifier, a trigger generator and a first modulator connected in series and having an aggregate first delay time, said modulator employing a first carrier frequency, a comparison network having a delay line and a network having an identical transfer characteristic as said delay line and a negligible delay time, a subtraction circuit, the inputs of said delay line and said network being connected in parallel, means connecting the outputs of said delay line and said network to separate inputs of said subtraction circuit, a second modulator employing a second carrier frequency connected to the input of said comparison network, means for providing an input signal to said second modulator, means connecting said synchronization loop between the output of said subtraction circuit and the input of said comparison network, said delay line having a delay time which varies with frequency, said modulators having carrier frequencies such that the delay of the synchronization signal which includes the delay of the delay line plus said first delay is equal to the delay of said input signal in said delay line, said amplifier having a frequency pass-band capable of passing said first carrier frequency and rejecting said second carrier frequency and a utilization circuit connected to the output of said subtraction circuit, said utilization circuit having a second frequency pass-band capable of rejecting said first carrier frequency and utilizing said second carrier frequency.

7. A pulse repetition frequency synchronization network comprising a delay line having a delay time which varies with frequency, a synchronizing loop including said delay line and having a fixed external delay, means providing a synchronizing loop signal at a first carrier frequency, a signal path including said delay line but not including said fixed external delay, means for providing a second signal to said signal path having a second carrier frequency, the carrier frequencies of said loop signal and said second signal being so related that the total delay time of said synchronizing loop at said first carrier frequency equals the delay time of said signal path at said second carrier frequency.

References Cited in the file of this patent

UNITED STATES PATENTS

| | | |
|---|---|---|
| 2,345,491 | Mason | Mar. 28, 1944 |
| 2,643,286 | Hurvitz | June 23, 1953 |
| 2,881,256 | Plouffe | Apr. 7, 1959 |